Patented Nov. 16, 1948

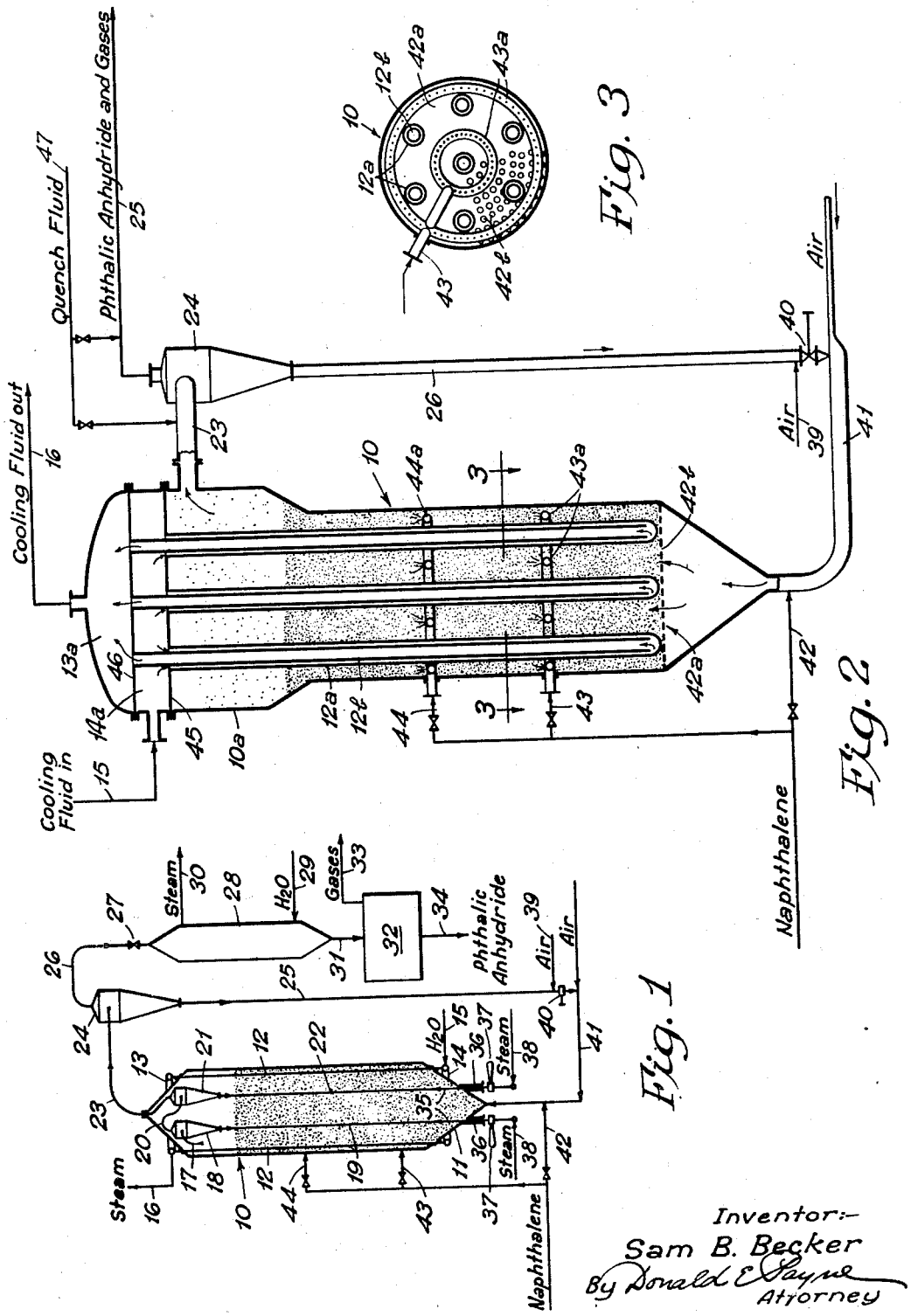

2,453,740

UNITED STATES PATENT OFFICE 2,453,740

OXIDATION OF ORGANIC COMPOUNDS AND MANUFACTURE OF PHTHALIC ANHYDRIDE

Sam B. Becker, Chicago, Ill., assignor to Standard Oil Company, Chicago, Ill., a corporation of Indiana Application February 16, 1945, Serial No. 578,310

6 Claims. (Cl. 260—342)

This invention relates to oxidation of organic compounds, such for example as the manufacture of phthalic anhydride by controlled oxidation of naphthalene, and it pertains more particularly to an improved method and means for effecting such oxidation. This is a continuation-in-part of my copending application Serial 400,134 filed June 27, 1941, now United States Patent No. 2,373,008.

An object of my invention is to provide an improved method and means for removing heat developed by the oxidation of naphthalene hydrocarbons to phthalic anhydride and to obtain a closer temperature control in such reactions than has heretofore been possible.

A further object of the invention is to provide an improved method and means for converting oil refinery by-products containing large quantities of alkyl naphthalenes into phthalic anhydride.

A further object is to decrease the cost of manufacturing phthalic anhydride and to increase the yields of this compound obtainable from crude naphthalene or alkyl naphthalene charging stocks. Other objects of the invention will be apparent as the detailed description thereof proceeds.

In practicing my invention I effect the oxidation of the naphthalene hydrocarbons by means of a finely divided solid or powdered catalyst which is maintained in turbulent dense phase suspension in the air which promotes the oxidation. A uniform temperature prevails throughout the entire zone occupied by turbulent dense phase suspended catalyst particles and "hot spots" and local overheating are entirely avoided. Heat may be abstracted from the oxidation zone by means of suitable heat exchangers provided that the heat exchange surfaces do not interfere with the turbulent catalyst phenomena exhibited by dense phase suspended catalyst with critically controlled gas velocities. In order to insure against any interference with the turbulent catalyst phenomena I may mount the heat exchange surfaces substantially vertically around the periphery of the oxidation zone or I may employ spaced vertical heat exchange surfaces within the oxidation zone itself when such surfaces are so spaced as to avoid interference with the dense phase phenomena and adequate means are provided for insuring distribution of introduced fluids.

As distinguished from the invention claimed in my copending application, the present invention utilizes spaced heat exchange surfaces in the oxidation zone itself and it utilizes the turbulence of the catalyst in the oxidation zone itself to absorb the heat of oxidation and give up said absorbed heat to a heat exchange fluid which is in indirect but heat exchange relationship with the contacting zone. The space above the dense catalyst phase is preferably maintained at a lower temperature than the dense catalyst phase itself and to effect still further quenching a relatively cool fluid may be introduced into the gaseous products prior to or simultaneously with the separation of residual catalyst particles therefrom.

The turbulent dense phase suspended catalyst phenomenon has been most conclusively demonstrated in connection with powdered solids having a particle size of about 10 to 100 microns, i. e., particles of about 200 to 400 mesh or finer. Such solids in settled or compacted state may have a bulk density of about 35 to 40 pounds per cubic foot. When subjected to mild aeration with gas velocities of about 0.05 to .5 feet per second these solids behave as a liquid with a bulk density of about 25 or 30 pounds per cubic foot. When the vertical velocity of the gas is about 1 to 3 feet per second, particularly about 1½ to 2½ feet per second the catalyst becomes suspended in a turbulent dense phase or mass having a bulk density of about 10 to 20, for example 15 pounds per cubic foot. Catalyst particles may be carried upwardly and beyond this dense phase by the ascending gases into a dispersed catalyst phase which is superimposed above the dense phase and separated therefrom by an interface, the average density of the light or dispersed phase usually being far less than 1 pound per cubic foot and usually only a matter of a few hundred grains per cubic foot. In the dense turbulent zone itself it appears that the gases pass upwardly at a fairly uniform velocity while the suspended catalyst particles are constantly moving in all directions, cascading from top to bottom and being transported from bottom to top, so that there is a substantially uniform catalyst distribution throughout the entire zone. The necessary vertical gas velocities for maintaining the dense turbulent phase conditions hereinabove described will depend to some extent on the density and character of the catalyst particles as well as on catalyst particle size; for extremely dense catalyst particles the necessary gas velocities may be as high as 5 feet per second or more while with less dense catalyst particles or particles with very rough catalyst surfaces the necessary turbulence may be produced by gas velocities as low as .5 feet per second. A feature of my invention in all cases is the use of such vertical gas velocities as to maintain an interface and a very small catalyst density in the light dispersed phase above the interface, preferably below 500 grains per cubic foot. By maintaining the dilute phase cooler than the dense phase and substantially free from oxidation catalyst undesirable side reactions are minimized.

The invention will be more clearly understood from the following detailed description read in conjunction with the accompanying drawings which form a part of this specification and in which similar parts are designated by like reference characters and in which:

Figure 1 is a schematic flow diagram of my process illustrating a vertical section of an oxidation chamber equipped with peripheral heat exchange surfaces;

Figure 2 is a schematic flow diagram of my process illustrating a vertical section of an oxidation chamber equipped with spaced vertical heat exchange surfaces throughout the oxidation zone, and Figure 3 is a vertical cross-section of the reactor along the lines 3—3 of Figure 2.

As a charging stock for my process I may employ "hot pressed" or centrifuged naphthalene from coal tar, i. e., a grade of naphthalene having a melting point of about 77 to 79° C. (pure naphthalene melts at 80° C.) A feature of my invention, however, is the utilization of petroleum refinery by-products and particularly the refractory stocks produced by thermal or catalytic cracking or reforming. In thermal or catalytic cracking processes for the production of gasoline from gas oils and heavier hydrocarbons one of the by-products is a refractory stock which may boil at about 400 to 550° F. and which is characterized by a large content of alkyl naphthalenes. The alkyl naphthalene content of such refractory stock may be further concentrated by recycling to the cracking step or further cracking in a separate cracking step or by extraction with selective solvents for the removal of paraffinic hydrocarbons.

An important source of naphthalene and alkyl naphthalenes is the refractory stock produced in a process of catalytically converting a low knock rating naphtha into high octane motor fuel by contacting the naphtha vapors with a catalyst such as molybdenum oxide, chromium oxide or vanadium oxide supported on active alumina, the contacting being effected at temperatures of about 900 to 1000° F., pressures of about 50 to 450 pounds per square inch, space velocities of about .2 to 2.0 volumes of liquid feed per volume of catalyst space per hour, said reaction being effected in the presence of hydrogen or recycle gas containing hydrogen. This process is referred to as hydrocatalytic reforming or hydroforming or dehydroaromatization. The heavier-than-gasoline fraction which is produced in this reaction is a refractory stock sometimes referred to as "reformate polymer" and it may have an A. P. I. gravity of about 11, a distillation range of about 450 to 600° F., a refractive index $$\left(N\frac{20}{D}\right) \text{ of } 1.591$$

and a specific dispersion of 264. This refractory stock contains large quantities of alkyl polycyclic aromatic hydrocarbons such as alkyl naphthalenes. The alkyl naphthalenes may be further concentrated by solvent extraction or distillation, or both, for example, an 8 to 16% fraction obtained by distillation may have a distillation range of about 440 to 490° F., and A. P. I. gravity of about 17, a refractive index of about 1.558 and a specific dispersion of about 224. A feature of my invention is the use of such by-product "refractory stocks" produced in petroleum refining processes for the production of phthalic anhydride.

As catalysts for my process I may employ Vth or VIth group metal oxides either unsupported or supported on suitable carriers such as alumina, silica gel, pumice, kieselguhr, or any other known catalyst supports. Activated alumina or silica gel may be impregnated with ammonium vanadate or ammonium molybdate or both and then dried and heated to about 900 to 1000° F. Silica hydrogel may be ball-milled with vanadium oxide, molybdenum oxide or other catalytic oxides and the resulting dough dried and heated as in the previous example.

In the following example I will describe a system for employing a catalyst consisting of a mixture of vanadium and chromium oxides supported on active alumina or silica gel but it should be understood that the invention is not limited to any particular catalyst composition or preparation. If more active catalysts such as tin vanadate are employed, the oxidation temperatures should be lower than set forth in the following examples because of the higher catalyst activity. By using the vanadium oxide or molybdenum oxide catalysts on relatively inert supports the reaction may be more easily controlled, particularly when the catalyst itself acts as a heat absorber and heat carrier as will be hereinafter described. I may use a finely divided or powdered catalyst having a particle size of about 10 to 100 microns and containing about 2 to 20% of vanadium oxide and molybdenum oxide. I will describe the use of such catalyst in a plant designed to produce about 2000 to 3000 pounds per day of phthalic anhydride from naphthalene or by-product petroleum refractory stocks.

The simplest system for practicing my invention is illustrated in Figure 1 wherein I provide cylindrical reactor 10 about 2 or 3 feet in diameter and about 5 to 10 feet or more in height. The reaction is provided with a cone-shaped bottom 11 the sides of which are relatively steep (i. e., about a 60 degree slope) so that the air which is introduced at the base of the cone-shaped bottom will sweep any catalyst particles therefrom and prevent substantial catalyst deposition. About 250 to 500 pounds or more of finely divided catalyst are placed in this reactor depending on catalyst activity and on space velocities to be employed in the reactor.

Around the periphery of the reactor I employ substantially vertical tubes 12 which extend through the top and bottom reactor walls to upper header 13 and lower header 14. Water may be introduced into the lower header through line 15 and steam withdrawn from the upper header through line 16 suitable provisions being employed for regulating the pressure of the generated steam and regulating the water level in tubes 12. Alternatively, of course, I may employ diphenyl, diphenyl oxide, a mixture of diphenyl and diphenyl oxide (Dowtherm), mercury, or any other heat exchange fluid in tubes 12 and I may generate steam by circulating said fluid through the tubes of a boiler outside of the reactor itself.

In or above the top of the reactor I provide cyclone separators for removing catalyst particles from the gases leaving the reactor. Thus gases from the top of the reactor may be introduced by inlet pipe 17 to primary cyclone 18 which is provided with a dip leg 19 extending to the lower part of the reactor. Gases from the primary cyclone are introduced by line 20 to secondary cyclone 21 which is provided with dip leg 22. Gases from the secondary cyclone may be passed through one or more additional internal cyclone stages or they may be withdrawn through line 23 to external catalyst separation means 24 which may be additional cyclone separators or may be an electrostatic precipitator or other conventional separation means. Catalyst from this external separator is returned to the system through line 25.

The catalyst-free reaction products are then passed through line 26 and pressure reduction valve 27 to heat exchanger 28 which may be a waste heat boiler for generating 15 pound process steam, the water being introduced into the exchanger through line 29 and the steam being withdrawn through line 30. The cooled gases and reaction products are then introduced through line 31 into separation chamber 32 from which gases are withdrawn through line 33 and the crude phthalic anhydride is periodically or continuously removed by line 34 or by any other conventional means. The specific method of fractionating the reaction products forms no part of the present invention and it will, therefore, not be described in further detail. Relatively pure phthalic anhydride may be separated from any unreacted naphthalene and from other conversion products by conventional processes of fractional sublimation, distillation, crystallization, etc.

Settled catalyst in dip legs or pipes 19, 22 and 25 must be maintained in fluent condition to avoid plugging or bridging. The internal dip legs may terminate above closure members 35 mounted on hollow stems 36 extending through the bottom wall to external operating means 37 and a gas such as steam or air may be introduced through line 38 and discharged from the upper part of closure member 35 through suitable vents for dispersing catalyst into the reactor when the closure is in open position, and for aerating or blowing out the dip legs when the closure members are in their upper closed position against the bottom of the dip legs. Similarly catalyst in pipe 25 may be aerated by air or steam introduced by line 39 and may be discharged into pipe 41 in amounts regulated by valve 40.

Air is introduced through line 41 at a pressure of about 15 to 20 pounds per square inch and in amounts of about 500 to 3000, for example about 2000 pounds per hour (about 25,000 cubic feet per hour measured at standard conditions of temperature and pressure). This air picks up catalyst from the base of pipe 25 and introduces it at the base of reactor 10 wherein it likewise suspends the catalyst returned to the base of the reactor through dip legs 19 and 22.

Naphthalene vapors may be introduced with the air in line 41 or may be introduced into the reactor at various levels through pipes 42, 43 or 44, the naphthalene charge being about 100 to 150, for example about 125 pounds per hour. Prior to the introduction of naphthalene vapors the reactor may be brought to reaction temperature by burning a gaseous fuel therein, by passing hot flue gases therethrough or by any other conventional means.

The reaction temperature will depend upon the specific catalyst and may range from about 500 to 1000° F. or more but with the vanadia-chromia catalyst I prefer to employ temperatures of about 900 to 960° F., for example about 930° F. With known types of oxidation catalyst however lower oxidation temperatures may be employed, for example, in the approximate range of 500 to 700° F. The oxidation of naphthalene to phthalic anhydride liberates a considerable amount of heat and the burning of alkyl side chains from alkyl naphthalenes liberates even greater amounts of heat. If "hot spots" or local overheating occurs in the reaction zone the oxidation will go too far with the production of decreased yields of phthalic anhydride and increased yields of carbon dioxide. An important feature of my invention is the method of heat removal and temperature control for obtaining maximum yields of valuable products.

Under the reaction conditions above stated the vertical gas velocity in the reactor will be about 1 to 3, for example, about 2 feet per second. At such vertical gas velocities the catalyst will be maintained in the turbulent dense phase suspended condition so that substantially identical temperatures prevail throughout the entire reactor. The heat which is liberated in the reaction generates steam in pipes 12 (or is picked up by a heat-absorbing fluid therein) and the turbulent motion of the catalyst in the reactor carries the heat from the main body of the reaction zone to the heat exchange surfaces which surround the reactor. Remarkably close temperature control may thus be provided by regulating the pressure at which steam is generated in pipes 12 (or controlling the temperature and amount of heat exchange fluid circulated).

The contact time in the reactor may range from about 1 to 4 seconds depending upon the point in the reactor at which the naphthalene vapors are introduced. With the particular catalyst employed a contact time of about 2 or 3 seconds should result in excellent conversions. Catalyst is continuously removed from gases and vapors leaving the top of the reactor and this removed catalyst is continuously re-introduced into the dense turbulent catalyst suspension. The pressure on the reaction gases and vapors may be reduced to about atmospheric in valve 27 so that the recovery system operates at normal atmospheric pressure.

It should be noted that after the gaseous stream leaves the dense phase interface it enters a dilute phase which is substantially free from catalyst so that oxidation is almost instantaneously discontinued. I prefer to maintain this dilute phase at even a lower temperature than the dense phase and this may be accomplished by the use of the system described in Figure 2. In the system of Figure 2 heat exchange tubes 12a extend downwardly at spaced intervals from header 45 to distributor 42a, tubes 12a being closed at their base and extending substantially to the distributor plate. The distributor 42a may be a steel plate with spaced perforations about ½-inch to 1-inch or more in diameter and arranged to uniformly distribute the incoming stream from line 41 throughout the space in the oxidation chamber 10 around tubes 12a. Internal tubes 12b extend downwardly from header 46 to a point near but spaced from the closed bottom of tubes 12a. Cooling fluid, such as diphenyl, diphenyl oxide, a mixture of diphenyl and diphenyl oxide (Dowtherm), mercury, or other heat exchange fluid, is introduced through line 15 to the space 14a between plates 45 and 46 which space is equivalent in function to header 14 of Figure 1. The cooling fluid passes downwardly in the annular space between tubes 12a and 12b and then upwardly through tubes 12b to the space 13a between the plate 46 and the top of the reactor vessel, this last-named space corresponding to header 13 of Figure 1.

Except for the specific type and arrangement of heating surfaces and headers it should be noted that the system of Figure 2 is substantially the same as that hereinabove described in connection with Figure 1. In the system of Figure 2, however, the heat exchange surfaces, are distributed throughout the oxidation zone in such a manner as to offer no interference to the dense phase phenomena. The arrangement of these surfaces in this particular case is shown in Figure 3. With a 3-foot diameter reactor, pipes 12a may be about 4 inches in diameter and on 12-inch centers while internal pipes 12b may be about 2½ to 3 inches in diameter. Generally speaking, pipes 12b should be about 2 inches to 6 inches in diameter and they should be mounted in such a manner that the minimum distance between the outer surfaces of adjacent pipes is about 4 inches. The minimum distance between pipes in the example is 8 inches. Preferably such minimum distance should be within the approximate range of 4 to 12 inches.

Figure 2 also illustrates the openings 42b in distributor 42a and it shows distributors 43a connected to line 43 for the introduction of naphthalene for oxidation. It should be understood however that no invention is claimed in the specific type of distributors employed and that any known type of distributors may be employed.

In the system illustrated in Figure 2 the dilute phase in the upper part of the oxidation chamber is markedly cooled by the cooling fluid above plate 45 and passing downwardly through the upper part of tubes 12a. This cooling prevents undesired side reactions particularly since the dilute phase is substantially free from catalyst material. The dilute phase may be of larger cross-sectional area than the dense phase by enlarging the upper part of the vessel as indicated at 10a; this provides for improved settling and minimizes the amount of solids which are removed from the dilute phase through line 23. The amount of solids thus removed may likewise be minimized by employing a vertical disengaging space above the dense phase level which is at least 2 feet and preferably upwards of 4 or 5 feet in height, the disengaging space being the distance from the dense phase interface to the level at which vapors are withdrawn through line 23.

Although the introduction of a quench fluid is usually not essential in my system, such fluid may be introduced through line 47 into line 23 or line 25 or even into the dilute phase in the upper part 10a of the oxidation vessel. Cold air or other inert fluid may be employed for this purpose. Also relatively cold make-up catalyst material or catalyst material which has been withdrawn from the oxidation chamber and cooled may be introduced to line 23 to effect quenching, such solids introduction tending to facilitate the handling of fines in recycle dip leg 26.

While the process has been described for the preparation of phthalic anhydride from naphthalene it should be understood that the temperatures, catalysts, oxygen concentrations and operating conditions may be varied throughout a fairly wide range in order to effect any desired extent of oxidation. Thus under proper conditions I may produce substantial amounts of alpha-naphthoquinone which, in turn, may be further oxidized to maleic anhydride. The phthalic anhydride may be further oxidized to benzoic acid. Naphthols are difficult to obtain because the presence of a hydroxyl group on the naphthalene ring greatly increases its activity toward oxygen, but under carefully controlled conditions even naphthols may be produced.

In the above description no special mention has been made of particular methods for vaporizing the naphthalene charging stock but it should be understood that naphthalene may be vaporized in suitable coil heaters and introduced into the reactor at or below reaction temperature or it may be vaporized by bubbling primary air through molten naphthalene and mixing secondary air with the vapors en route to the reactor. By separately vaporizing the naphthalene and introducing it at the proper level in the reactor I may control the contact time and thus determine the extent of oxidation which is effected. A feature of my invention is the much larger yields of valuable oxidation products and lower yields of carbon dioxide than were obtainable in processes heretofore employed.

I have described the use of a powdered catalyst of about 200 to 400 mesh, but it should be understood that larger particle sizes may be employed if the vapor velocities in the reactor are properly modified to maintain the desired turbulent dense phase suspension. In any event, it is important to maintain dense turbulent catalyst phase conditions in the oxidation section of the contacting vessel superimposed by a dilute phase catalyst disengaging space and to avoid narrow catalyst passageways or obstructions in the oxidation zone which might interfere with the dense phase phenomena.

A particularly advantageous type of catalyst for my process is the spherical type prepared by the gelation of a colloidal solution while suspended as droplets in a liquid medium immiscible therewith. For example, an alumina sol prepared by the method described in U. S. Reissue Patent 22,196 may be distributed as droplets in oil or other immiscible liquid and coagulated and set to give spherical particles of desired size. Electrolytes may be employed for effecting the coagulation and setting but the use thereof may be dispensed with when the composition of the sol and the conditions of droplet suspension are properly controlled. The spherical gel particles may be washed to remove undesirable ions, impregnated with salts of vanadium, chromium or other desired catalyst material, dried and heated to a temperature in the range of 500 to 1000° F. or more. Spherical catalysts may be prepared from silica sols in the same manner. These small spherical catalyst particles, sometimes called "microspheres," seeds or "beads" are preferably of small particle size, i. e. have an average diameter within the approximate range of 3 to 300 microns, preferably within the aproximate range of 10 to 100 microns. Their hard gel structure, rounded surfaces, and relative freedom from internal stresses and strains makes them highly resistant to fracture and disintegration. The use of such catalyst particles reduces to a minimum the erosion of equipment, lines, and valves. Also the use of such catalysts reduces to a minimum the tendency toward catalyst carry-over from the oxidation zone. Simple cyclone separation is adequate to prevent catalyst losses and even cyclone separators are not always necessary. The use of catalyst in the form of microspheres will produce remarkable and outstanding results in the oxidation of vaporizable organic materials in the process of my invention.

The internal tubes employed in the system of Figure 2 may be referred to as bayonet type exchanger tubes. In Figure 2 such tubes depend downwardly from the upper part of the contacting zone. It should be understood, however, that such bayonet type tubes may extend upwardly from the bottom of the oxidation zone, the header plates being mounted in the bottom instead of in the top of the reaction vessel, suitable provision being made for the introduction and distribution of introduced air above the headers and the bayonet tubes extending upwardly into the dense catalyst phase at such spaced intervals as to prevent interference with the dense phase phenomena.

While the use of cyclone separators has been described for preparing catalyst from the light dispersed catalyst phase it should be understood that filters or any other separation means may be employed instead of or in addition to the cyclone separators. Also the cyclone separators may be employed either internally or externally of the oxidation zone.

While I have described in detail certain preferred embodiments of my invention as applied to a particular process it should be understood that my invention is not limited to the specific systems or to the specific operating conditions hereinabove set forth. Numerous modifications and alternative procedures and conditions may be apparent to those skilled in the art from the above description.

I claim:

1. The method of converting naphthalene hydrocarbons into phthalic anhydride which comprises maintaining in an oxidation zone a large mass of solid oxidation catalyst particles having particle size chiefly within the range of about 10 to 100 microns, passing a stream consisting essentially of air and naphthalene hydrocarbon vapors upwardly through said mass of catalyst particles at a velocity in the range of about .5 feet per second to about 5 feet per second and sufficiently low to maintain the catalyst as a suspended dense turbulent phase superimposed by a light dispersed catalyst phase above the dense phase level, maintaining said dense turbulent catalyst phase at a substantially constant oxidation temperature by continuously and in situ extracting heat from the dense phase above the point at which air is introduced thereinto, employing a vertical disengaging space above the dense phase level which is at least 2 feet in height, maintaining the dispersed catalyst phase in the disengaging space at a lower temperature than the temperature of the dense turbulent phase, separating catalyst particles from the gasiform stream withdrawn from the upper part of the disengaging space and returning said separated particles to said dense phase.

2. The method of converting naphthalene hydrocarbons into phthalic anhydride which comprises maintaining in an oxidation zone a large mass of solid, substantially spherical oxidation catalyst particles having an average particle size within the range of about 10 to 100 microns, passing a stream comprising oxygen and naphthalene hydrocarbon vapors upwardly through said mass of catalyst particles at a velocity in the range of about .5 feet per second to about 5 feet per second and sufficiently low to maintain the catalyst as a suspended dense turbulent phase superimposed by a light dispersed catalyst phase above the dense phase level, maintaining said dense turbulent catalyst phase at a substantially constant oxidation temperature by continuously and in situ extracting heat from said dense phase above the point at which air is introduced thereto, employing a large vertical disengaging space above the dense phase level which is at a lower temperature than the temperature of the dense turbulent phase, withdrawing a gasiform stream from the upper part of the disengaging space, separating catalyst particles from said last named stream, returning said separated particles to said dense phase and recovering phthalic anhydride from said withdrawn stream after catalyst particles have been separated therefrom.

3. The method of converting naphthalene hydrocarbons into phthalic anhydride which comprises maintaining in an oxidation zone a large fluidized mass of solid substantially spherical oxidation catalyst particles having a particle size within the range of about 3 to 300 microns, passing a stream comprising air and naphthalene hydrocarbon vapors upwardly through said mass of catalyst particles at a velocity in the range of about .5 feet per second to about 5 feet per second and sufficiently low to maintain the catalyst as a suspended dense turbulent phase superimposed by a light dispersed catalyst phase above the dense phase level, maintaining said dense turbulent catalyst phase at a substantially constant oxidation temperature in the range of about 500° F. to 1000° F. by continuously in situ extracting heat from said dense phase above the point at which air is introduced thereto, separating catalyst particles from product gases before said product gases are withdrawn from the oxidation zone, and recovering phthalic anhydride from withdrawn gases from which catalyst particles have been removed.

4. In the process of converting naphthalene hydrocarbons into phthalic anhydride by air oxidation in the presence of a catalyst comprising an oxide of a metal selected from groups V and VI of the periodic system, the improved method of operation which comprises employing in the oxidation zone a deep mass of catalyst particles having a particle size chiefly in the range of about 10 to 100 microns, distributing introduced air at the base of said zone, introducing naphthalene hydrocarbons at at least one low point in said zone, introducing per pound of naphthalene hydrocarbons about 5 to 30 pounds of air and introducing air and naphthalene hydrocarbons at a rate sufficient to provide an upward gasiform stream velocity in the oxidation zone in the range of .5 to 5 feet per second and sufficiently low to maintain the catalyst as a suspended dense turbulent phase superimposed by a light dispersed catalyst phase in a catalyst disengaging space which extends upwardly a substantial distance above the dense phase level, maintaining the oxidation zone at a substantial constant temperature in the range of 500 to 1000° F. by removing heat in situ directly from the dense phase above the point at which air is introduced into said zone, separating catalyst particles from the gasiform stream while it is being withdrawn from the upper part of the disengaging space, returning said separated particles to said dense phase and recovering phthalic anhydride from the withdrawn stream after catalyst particles have been separated therefrom.

5. The process of claim 4 in which the naphthalene hydrocarbons are alkyl naphthalenes produced by the hydroforming of a petroleum naphtha and which boil chiefly within the range of 450 to 600° F., which have a refractive index within the range of about 1.5 to 1.6 and which have an A. P. I. gravity within the range of about 10 to 20.

6. The method of converting naphthalene hydrocarbons into phthalic anhydride which comprises introducing said hydrocarbons at at least one low point into an oxidation zone containing a deep mass of solid oxidation catalyst particles comprising vanadium oxide and having a particle size chiefly within the range of 10 to 100 microns, introducing an air stream at the base of said zone at such a rate as to maintain therein an upward gasiform stream velocity in the range of .5 to 5 feet per second and sufficiently low to maintain the catalyst as a suspended dense turbulent phase superimposed by a light dispersed catalyst phase in a catalyst disengaging space which extends upwardly a substantial distance above the dense phase level, operating said oxidation zone under pressure of about 15 to 20 pounds per square inch at a temperature of about 700° F., introducing about 5 to 30 pounds of air per pound of naphthalene hydrocarbons introduced, maintaining a substantially constant temperature in the oxidation zone by removing heat in situ directly from the dense phase above the point at which air is introduced into said zone, separating catalyst particles from the gasiform stream withdrawn from the upper part of the disengaging space, returning said separated particles to said dense phase and recovering phthalic anhydride from said withdrawn stream after catalyst particles have been separated therefrom.

SAM B. BECKER.

REFERENCES CITED

The following references are of record in the file of this patent:

UNITED STATES PATENTS

| Number | Name | Date |
|---|---|---|
| 1,916,473 | Forrest et al. | July 4, 1933 |
| 1,972,937 | Jaeger | Sept. 11, 1934 |
| 2,373,008 | Becker | Apr. 3, 1945 |
| 2,409,780 | Mekler | Oct. 22, 1946 |